United States Patent
Joyce et al.

(10) Patent No.: US 9,262,039 B1
(45) Date of Patent: Feb. 16, 2016

(54) DISPLAYING DATA STORAGE SYSTEM INFORMATION

(75) Inventors: Scott E. Joyce, Foxboro, MA (US); Anirudh Takkallapally, Natick, MA (US); Vidhi Bhardwaj, Milford, MA (US); Sreenath Rajagopal, Natick, MA (US)

(73) Assignee: EMC Corporation, Hopkinton, MA (US)

( * ) Notice: Subject to any disclaimer, the term of this patent is extended or adjusted under 35 U.S.C. 154(b) by 1048 days.

(21) Appl. No.: 12/164,407

(22) Filed: Jun. 30, 2008

(51) Int. Cl.
*G06F 3/0481* (2013.01)

(52) U.S. Cl.
CPC ..................................... *G06F 3/0481* (2013.01)

(58) Field of Classification Search
USPC ......................................................... 715/853
See application file for complete search history.

(56) References Cited

U.S. PATENT DOCUMENTS

| | | | | |
|---|---|---|---|---|
| 7,328,325 | B1* | 2/2008 | Solis ..................... | G06F 3/0605 711/202 |
| 7,627,617 | B2* | 12/2009 | Kavuri et al. ......................... | 1/1 |
| 8,051,389 | B2* | 11/2011 | Hallisey ................ | G06F 3/0481 715/810 |
| 2002/0046240 | A1* | 4/2002 | Graham et al. ............... | 709/203 |
| 2003/0063134 | A1* | 4/2003 | Lord et al. ..................... | 345/853 |
| 2004/0243945 | A1* | 12/2004 | Benhase ............... | G06F 3/0482 715/853 |
| 2005/0071482 | A1* | 3/2005 | Gopisetty et al. ............. | 709/229 |
| 2006/0044318 | A1* | 3/2006 | Cherdron ..................... | 345/581 |
| 2008/0134135 | A1* | 6/2008 | Elaasar ......................... | 717/104 |
| 2008/0147657 | A1* | 6/2008 | Vora et al. ......................... | 707/6 |
| 2008/0250028 | A1* | 10/2008 | Rutherglen et al. ............. | 707/10 |

* cited by examiner

*Primary Examiner* — William Bashore
*Assistant Examiner* — Hien Duong
(74) *Attorney, Agent, or Firm* — John T. Hurley; Jason A. Reyes; Krishnendu Gupta

(57) ABSTRACT

A method is used in displaying data storage system information. A graphical user interface (GUI) is provided that includes a tree structure of GUI components. Each of the GUI components is representative of an object in a data storage system. The tree structure includes lightweight information for the GUI components. At least one of the GUI components is updated by exercising a model view controller architecture. The GUI component is derived from a model chain that includes at least two models.

20 Claims, 14 Drawing Sheets

DISPLAYING DATA STORAGE SYSTEM INFORMATION

BACKGROUND

1. Field of the Invention

The present invention relates to displaying data storage system information.

2. Description of Prior Art

Information services and data processing industries in general have rapidly expanded as a result of the need for computer systems to manage and store large amounts of data. As an example, financial service companies such as banks, mutual fund companies and the like now, more than ever before, require access to many hundreds of gigabytes or even terabytes of data and files stored in high capacity data storage systems. Other types of service companies have similar needs for data storage.

Data storage system developers have responded to the increased need for storage by integrating high capacity data storage systems, data communications devices (e.g., switches), and computer systems (e.g., host computers or servers) into so-called "storage networks" or "Storage Area Networks" (SANs.)

In general, a storage area network is a collection of data storage systems that are networked together via a switching fabric to a number of host computer systems operating as servers. The host computers access data stored in the data storage systems (of a respective storage area network) on behalf of client computers that request data from the data storage systems. For example, according to conventional applications, upon receiving a storage access request, a respective host computer in the storage area network accesses a large repository of storage through the switching fabric of the storage area network on behalf of the requesting client. Thus, via the host computer (e.g., server), a client has access to the shared storage system through the host computer. In many applications, storage area networks support hi-speed acquisitions of data so that the host servers are able to promptly retrieve and store data from the data storage system.

Conventional storage area network management applications typically include a graphical user interface (GUI) that enables a network manager to graphically manage, control, and configure various types of hardware and software resources associated with a corresponding managed storage area network. For example, one conventional storage management application generates a graphical user interface utilized by a storage administrator to graphically select, interact with, and manage local or remote devices and software processes associated with the storage area network. Based on use of the graphical user interface in combination with an input device such as a hand operated mouse and corresponding pointer displayed on a viewing screen or other display, a storage administrator is able to manage hardware and software entities such as file systems, databases, storage devices, volumes, peripherals, network data communications devices, etc., associated with the storage area network. Consequently, a storage management station and associated management software enables a storage administrator (a person responsible for managing the storage network) to manage the storage area network and its resources.

One example of this kind of graphical user interface includes a screen presentation that may include toolbars with accompanying menus and menu items as well as displays such as graphs, maps or trees.

In a display to which the term "tree" presentation or display is applied, one element in the tree is visually connected from another element in the tree somewhat reminiscent of a tree-branching, giving rise to the term. This display would be familiar to users of various commercially-available software packages, such as Microsoft's Windows Explorer® software. The element at treetop is normally called a "root node" or "parent" and elements connected directly below and from that root node are termed "children" of that root node. Children of that root node's children are "grandchildren" of the root node, etc., comprising the "descendents" of that root node. Any child node in the descendent hierarchy can be selected or considered as a "local root node" for its descendents. These displayed nodes, which are visible to computer users, are normally constructed within the computer system or network as software "objects" which are then handled or controlled by object-oriented software running in the system or network.

A typical computer network being used today that can run object oriented software is a client-server network, the client being the user (GUI) or workstation and the server being software (discrete or distributed throughout the network) which serves the client. In this network, a computer system can employ one or more object-oriented computer languages such as C++, XML (eXtensible Markup Language), JAVA, and/or others. Briefly, an object, in computer software terms, is a dedicated area of memory which can be thought of as an impervious container holding both data and instructions within itself, both defining itself and its relationships to other objects in the computer system or network. Such object or node can send and receive messages to and from other objects, respond and react to such messages (e.g. commands) but shall normally be impervious to internal scrutiny. For example, in a computer data storage system (a kind of computer) each object (system object) may describe or relate to a specific tangible detail in the storage system or in the storage system's processor (e.g., details such as those describing or relating to aspects of operation of the processor's cooling-fan, power switch, cache memory, power supply, disk drive interface, individual disks, etc.). These tangible objects (nodes) within the storage processor in the storage system can send messages to each other within the storage system and to other objects outside the storage system over the network with which they are operatively coupled. The relationship between these specific objects in the storage processor is usually visualized or characterized as the tree to which reference was earlier made. In this tree, many children may typically hang from the same parent. In addition to these kinds of tangible objects, logical units (LUNs) are other nodes or objects that can be contained within a tree. Also, the storage processor itself and/or the storage system itself can be objects and interact as individual nodes, respectively, with other nodes in their network.

The tree relationship of these node objects may be displayed in tree fashion on the terminal screen of the GUI. This display is controlled, in part, by a large, fixed body of complex code which "paints" this tree display on the terminal screen.

SUMMARY OF THE INVENTION

A method is used in displaying data storage system information. A graphical user interface (GUI) is provided that includes a tree structure of GUI components. Each of the GUI components is representative of an object in a data storage system. The tree structure includes lightweight information for the GUI components. At least one of the GUI components is updated by exercising a model view controller architecture. The GUI component is derived from a model chain that includes at least two models.

BRIEF DESCRIPTION OF THE DRAWINGS

Features and advantages of the present invention will become more apparent from the following detailed description of exemplary embodiments thereof taken in conjunction with the accompanying drawings in which.

DESCRIPTION OF EMBODIMENT(S)

Figure 1:
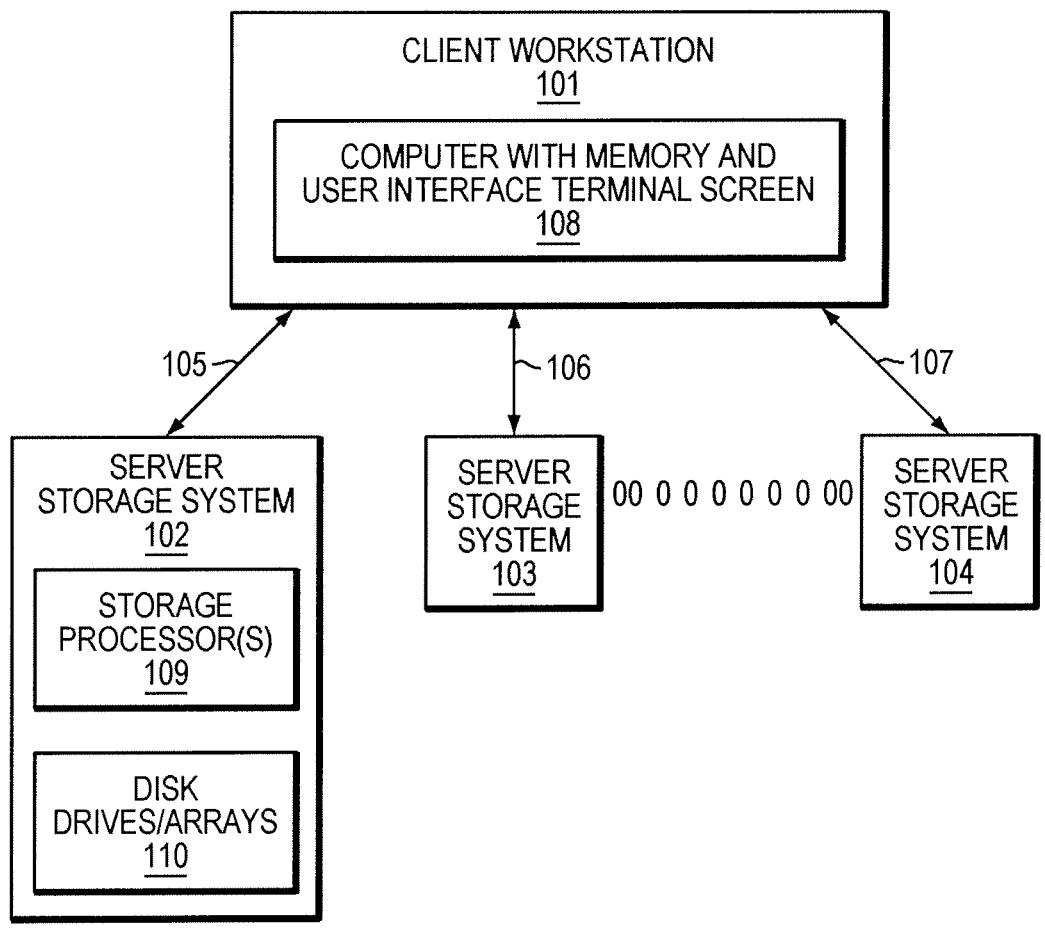
FIG. 1 is a block diagram of an exemplary client-server network showing a computer storage system in which embodiments of the present invention are particularly useful.

Described below is a technique for use in displaying data storage system information. In accordance with the technique, a user interface can be provided in which memory use can be reduced and performance can be increased using model chaining as described below. Model chaining extends a model-view-controller (MVC) design patterns (also referred to as an architectural pattern). In accordance with model chaining, models are chained together so that each model can add value to the previous model. MVC and/or model chaining methods are described in the following references, all of which are hereby incorporated by reference herein in their entirety: Buschman et al: Pattern-Oriented Software Architecture: A System of Patterns, John Wiley & Sons, 1996; U.S. Pat. Nos. 7,305,679 and 7,114,127; KOFMAN, V. Creating Interactive GUIs with Swing's MVC Architecture [online], Apr. 7, 2004 [retrieved on 2008-06-20], retrieved from the Internet:<URL: http://www.developer.com/java/ent/print.php/3336761>; KOFMAN, V. Creating Interactive GUIs with Swing's MVC Architecture Part 2: Dynamic View for a Static Model [online], Jun. 3, 2004 [retrieved on 2008-06-20], retrieved from the Internet: <URL: http://www.developer.com/java/ent/print.php/3362811>; and Model-view-controller [online], Jun. 19, 2008 [retrieved on 2008-06-20], retrieved from the Internet: <URL: http://en.wikipedia.org/wiki/Model-view-controller>.

The MVC architectural pattern divides an interactive application into three components. The model contains the core functionality data. Views display information to the user. Controllers handle user input. Views and controllers together can comprise the user interface.

The model component therefore encapsulates core data and functionality. The model is independent of specific output representations or input behavior. Views components display information to the user. A view obtains the data from the model. The controller component receives input, usually as events that encode mouse movement, activation of mouse buttons or keyboard input. Events are translated to service requests for the model or the view. The user interacts with the systems solely through controllers. An object-oriented implementation of MVC defines a separate class for each component.

Model chaining (or installing filters) allows for the manipulation of the presentation without changing the data itself. Model chaining relies on inheritance, passing objects by reference, and event/listener mechanisms. Inheritance is used when custom models sub-class default model objects and override or extend default methods. In an example, filter models have constructors that take a reference to a table model and do not actually hold any data. However, they do override indexing methods of the table model interface and hold an internal index of the data. This allows creating custom model, passing it by reference to the filter model and then installing the filter model into the table. Therefore, the table uses indexing and locating methods of the filter to represent actual data, stored in a separate custom model object. More filters may be chained on top of each other.

Conventionally, a user interface displaying data storage system information was produced using a single model approach. By contrast, in accordance with the technique, components of the user interface are logically separated and the user interface scales effectively with a large number of objects being the subject of the user interface.

In at least some implementations the technique may be used together with at least one or more aspects of user interfaces and/or methods for enabling them that are disclosed in the following patents, all of which are assigned to the assignee of the present invention and application, and all of which are hereby incorporated by reference herein in their entirety: U.S. Pat. No. 7,240,323 to Desai, et al., issued Jul. 3, 2007, entitled "Plug and Play Interface for User Actions", and in U.S. Pat. No. 7,386,835 to Desai, et al., issued Jun. 10, 2008, entitled "Technique for Graphical User Interface Modification".

FIG. 1

Client/Server Network

FIG. 1 is a block diagram of an exemplary client-server network showing a computer storage system in which implementations of the technique can be particularly useful, although it must be understood that implementations of the technique can be useful in any context in which a GUI is used. Client or client workstation 101 includes a computer having memory and a user interface (UI) terminal screen 108 which typically operates with keyboard and mouse (not shown) through which a human user can interact with the network. The server may be depicted as a storage system, and in this example multiple storage systems 102, 103, and 104 are shown. More than three storage systems can be used in this network as implied by the dots. The storage systems include at least storage processor(s) 109 and disk drives and disk arrays 110. Client workstation 101 is connected to server and storage systems 102, 103, and 104 via bidirectional buses 105, 106, and 107 respectively.

In a particular embodiment, the standard Internet hypertext transfer protocol (HTTP) may be used by the client to communicate with the arrays. Initially, at start-up, the UI portion of the software may be on one or more of the arrays. The software is just "housed" on the array but does not run on the array. In this embodiment, a user brings up its web browser software on its terminal and points it to the array(s) containing this UI portion of the software by typing the appropriate array address into the universal resource locator (URL) slot in the browser. The relevant software is then downloaded to the client workstation 101, and after that the software runs on the workstation. The technique, in this particular embodiment, may thus operate within client 101, but its operation includes the obtaining of software objects, or instances of classes of software objects, from storage systems outside of the client in order to advantageously effectuate GUI display changes, as to be more fully explained hereinbelow. Alternatively, the software of the present technique could have been housed within the client workstation without effecting overall operation of the technique.

FIG. 2

Schematic Block Diagram

Figure 2:
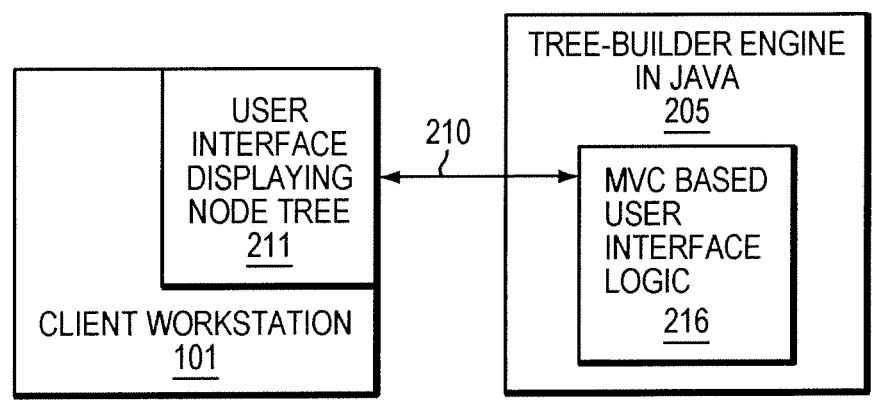
FIG. 2 is a schematic block diagram including an embodiment of the present invention within the context of the network of FIG. 1.
Figure 3:
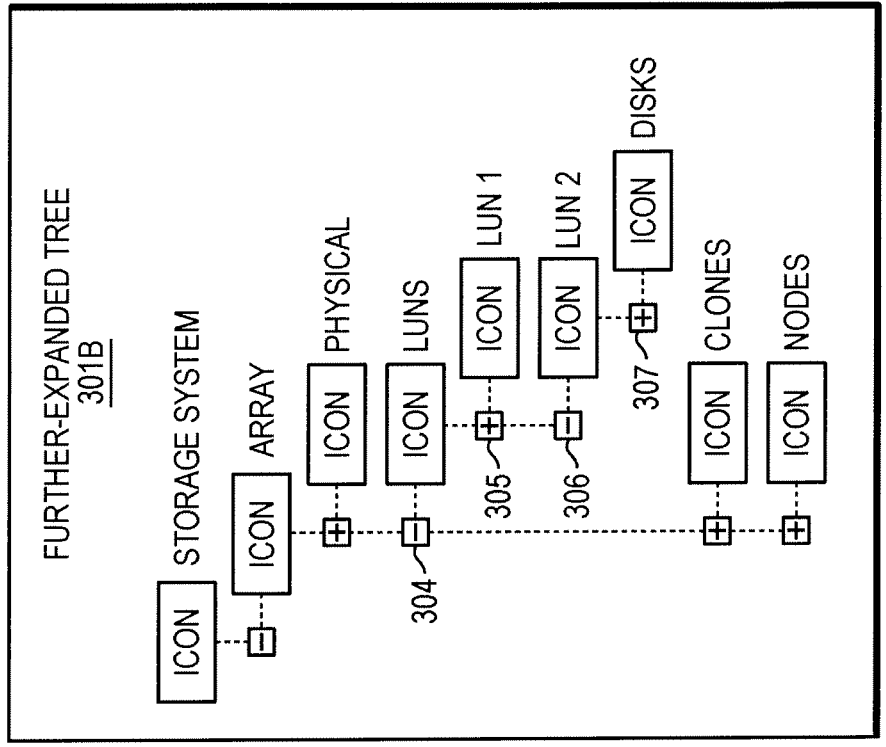
FIG. 3 is a schematic diagram of exemplary tree representations as they might be presented in a GUI display.
Figure 3:
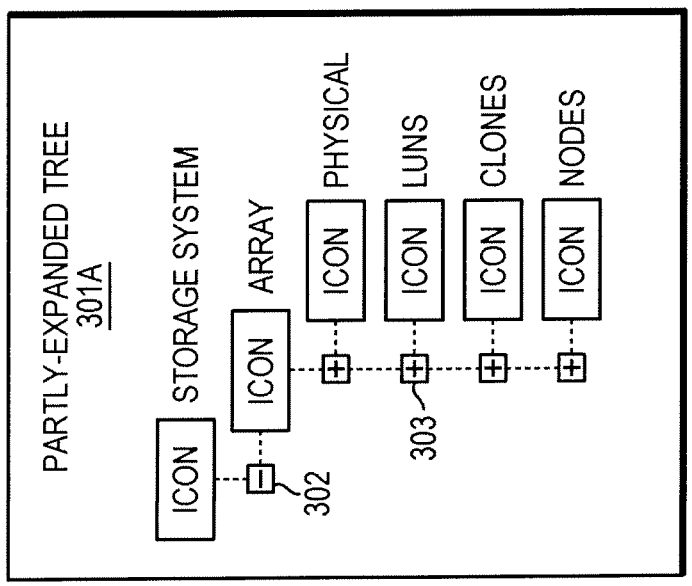

FIG. 2 is a schematic block diagram including software functionality embodied in the technique within the context of the network of FIG. 1. At the left of the diagram, client workstation 101 of FIG. 1 is shown containing user interface 211 displaying, in this example, a node tree. (An example of a node tree is shown in FIG. 3 to be discussed hereinbelow.) Display formations presented in the GUI, other than tree formations, can also be modified utilizing principles of the technique. Tree builder 205 with its MVC based user interface logic 216, which is operatively coupled to tree builder 205, is physically contained within either client workstation 101 or server 102 or both, and is described in more detail below. The user's request (as the user clicks-on button 302 in display 301A) is operatively coupled over bidirectional bus 210 to tree builder 205.

FIG. 2 (Continued) and FIG. 3

Tree Display

Tree Construction—Network User Input:

In order to invoke tree construction, the network user, operating through client workstation 101, has to make a request of the depicted functionality to construct a tree. Consider the user to be displaying a particular tree of objects or nodes from the client-server system of FIG. 2 on its terminal. This tree of objects would be a subset of the entire plurality of objects in the system each of which the system is capable of displaying but only in groups or subsets of objects. The user calls into play the operation of the functionality shown in FIG. 2 when the user expands the displayed tree. For example, consider the tree of objects in FIG. 3, which is a schematic diagram of two exemplary tree representations, 301A and 301B, as they might be sequentially presented in a GUI display.

In display 301A a partly-expanded tree is shown. Button 302 alongside the "ARRAY" icon had earlier been left-clicked-on (using mouse, cursor, and terminal screen in the ordinary fashion) which converted what was the button's positive (+) sign to the negative (−) sign shown. Simultaneously with the activity of left-clicking on button 302, an expansion of the tree had occurred, which enabled children of parent ARRAY to be displayed, namely children: "PHYSICAL", "LUNS", "CLONES", and "NODES". If any of the buttons associated with any of these children is then left-clicked-on, that button will convert from positive (+) to negative (−) and show a further expansion of the tree. For example, if button 303 is left-clicked-on, the tree is further expanded as shown in display 301B. (As will be understood, displays 301A and 301B appear sequentially and not simultaneously on the terminal screen.) In display 301B, button 304 which shows a negative sign (−) is the former button 303 which had showed a positive (+) sign prior to its being left-clicked-on. Button 304 is associated with the LUNS child node of the ARRAY parent node. The LUNS node expands to show its two children, namely: LUN 1 and LUN 2 having buttons 305 and 306 respectively. In similar fashion, button 306 was subsequently clicked on which turned it from positive (+) to negative (−) while it expanded to show one child of LUN 2, namely: "DISKS" with its button 307 as shown. Implementations of the technique enable construction or building of these tree displays in a particularly advantageous manner.

FIGS. 4-13 illustrate aspects of an example implementation of tree builder 205 and MVC based user interface logic 216 in accordance with the technique. With respect to the technique, in at least some cases within a model chain as described below, the model link order can changed, links can be added and removed, and chains can spawn off existing chains. There may be several different models and views of the same core dataset. Modifying the data in one model in the chain can cause modifications to each model in the chain from that point on.

At least one implementation include the following models:

Core model CoreModel: Lightweight model that generates a parent child list of object keys. This model builds its child nodes on demand/as needed.

Populated model PopulatedModel: Model that loads and formats the object properties for display.

Sorted model SortedModel: Model that sorts the children.

Filtered model FilteredModel: Model that filters unwanted nodes.

Consolidated model ConsolidatedModel: Model that takes two underlying models and makes it appear as one.

More model MoreModel Model that visually serves up a chunk or subset of data at a time. Allows more nodes to be added if desired (children of a parent).

Morphed model MorphedModel Model that presents one parent's child/children as if it belongs to another parent.

In an example, a graphical user interface tree view is provided as follows:

Core model child nodes are only built as needed (e.g., on expansion of parent).

Core model child nodes are inserted to listening models in chunks (e.g., in chunks of 500 each).

Child property information is retrieved via a single multi-request network call.

Display labels and icons are built from the property information and the child property information is removed from memory in order to free up resources.

Change observers are registered so that the label and icon can be rebuilt upon change.

A more and all option is displayed to an end user when applicable to retrieve the next chunk of data.

In at least some implementations, use of the technique helps reduce memory spikes. In particular, use of the more model in conjunction with the core model helps reduce memory spikes. Network data being sent and coming back uses less memory. A memory spike to process network data related requests is controlled to avoid producing a tree in which a parent has more children that can be managed in view of memory and processing limitations.

In the following example, a parent has 5000 children (nodes) to be displayed. The core model builds this list and only saves a lightweight key that represents each child. The core model only inserts 500 children into the next model so that the memory to process these children is controlled. The more model presents the 500 children along with another special child named "more". When this "more" child is selected by an end user, another chunk of 500 nodes is added to the model. This example takes into account that multiple views may be viewing the more model. One of the views may only want to see 500 nodes and another of the views may wants to see all 5000 nodes.

In at least some implementations, a performance benefit of the technique is that since only a subset of the children nodes are being handled, a faster response is provided to the user, since otherwise the user would need to wait during the processing of all 5000 nodes.

The technique may make use of on-demand loading such that the items kept in memory are limited to a lightweight object key ("ID" or "id") in memory and the object information that is currently on the screen. As the user scrolls down the view (e.g., table or tree) resources for the objects that are off screen can be dropped and properties for the object that are on the screen can be loaded.

Now described are more details of the technique, especially with respect to the framework of a data storage system user interface. At least one implementation provides one or more of the following features and/or advantages.

A model can be reused and represented in different manners or views.

A model is not required to populate/expand until the data is needed.

A model tracks the object relationship and hierarchy and does not track the needs of views or listeners of the model.

A view is capable of transforming a lightweight id based tree node structure into a practical display. Thus, the view can take the id and obtain the properties it needs for display.

Models and views are decoupled and only communicate via tree model events.

Network calls to populate and expand tree nodes occur outside an event dispatch thread to help prevent the user interface from freezing.

The number of network calls is held to a manageable level (e.g., using a batch request function as described below).

The model and views hold references to necessary objects/data only, allowing more objects to be made eligible for garbage collection.

A model-view-controller architecture is used such that built in event capabilities are used to update a view upon add, remove, and changes within the model. This architecture saves resources by only updating components of the user interface as needed.

Multi-request is used to avoid requiring a high number of network calls.

In at least some cases a model builder obtains a large list of objects and filters out the objects that are not needed. Instead of including comprehensive display properties just in case any of them need to be displayed to the user, a thin model is used such that only the properties that are needed to perform the filtering are requested.

Observer registration is threaded off so that a response can be provided to the user while a background worker thread is registering observers.

An object pool is organized to hold only weak references to objects, to allow objects that are not being used elsewhere to be removed from memory.

An indication manager is organized so that it does not hold a reference to an object but to an instance of the object, to allow an indication to be registered on an object that is not in memory.

The tree (including model builders and view builders) hold references to instances instead of the object, thereby making the objects eligible for garbage collection after they have been processed. For example, a tree node label can be generated using the properties of the object, such that the builder can then register observers on the object and drop the reference to the object. This makes the object and all properties within it eligible for garbage collection.

Due to the separation of the model and view, a view specific XML is provided in a separate object/key based file. This format simplifies the model xml and limits duplication view specific XML information.

Tree based network calls are made outside of an event dispatch thread to help prevent the user interface from producing a frozen effect.

Model builders are in a simplified format with extended capabilities.

Now described are high level patterns that are used to generate the tree.

Figure 4:
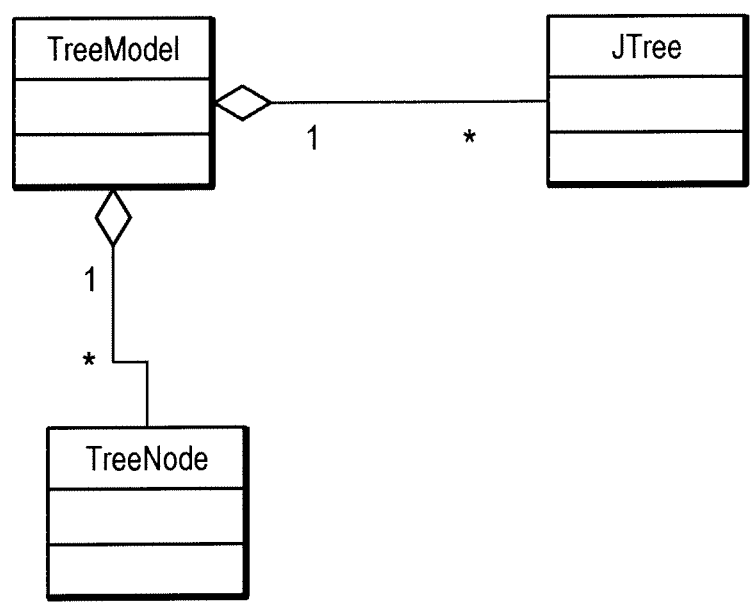
FIGS. 4-13 are illustrations of components that may be included in an embodiment of the network of FIG. 1.

FIG. 4 illustrates interaction defined within the javax.swing package, available from Sun Microsystems, Inc. at <URL: http://java.sun.com/j2se/1.4.2/docs/api/javax/swing/package-summary.html>. In at least one implementation, the technique makes use of the core design provided by java.

Figure 5:
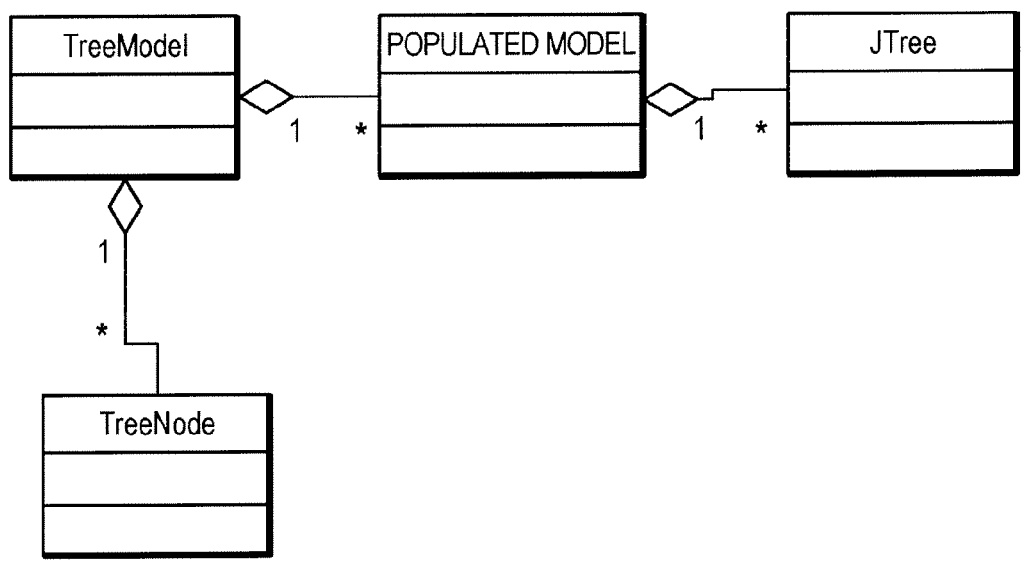

With reference to FIG. 5, the lightweight model includes aspects of the base javax.swing tree but enables the underlying model to contain only lightweight objects allowing different views to load and display different information.

For the purposes of the technique the TreeNodes are generated via builders. Each TreeNode represents a user interface object or an instance. The builders only load the properties that are required to maintain the structure of the model and do not load any view specific properties. The Populated Model is view aware and references an XML file to load the required properties for its view.

Figure 6:
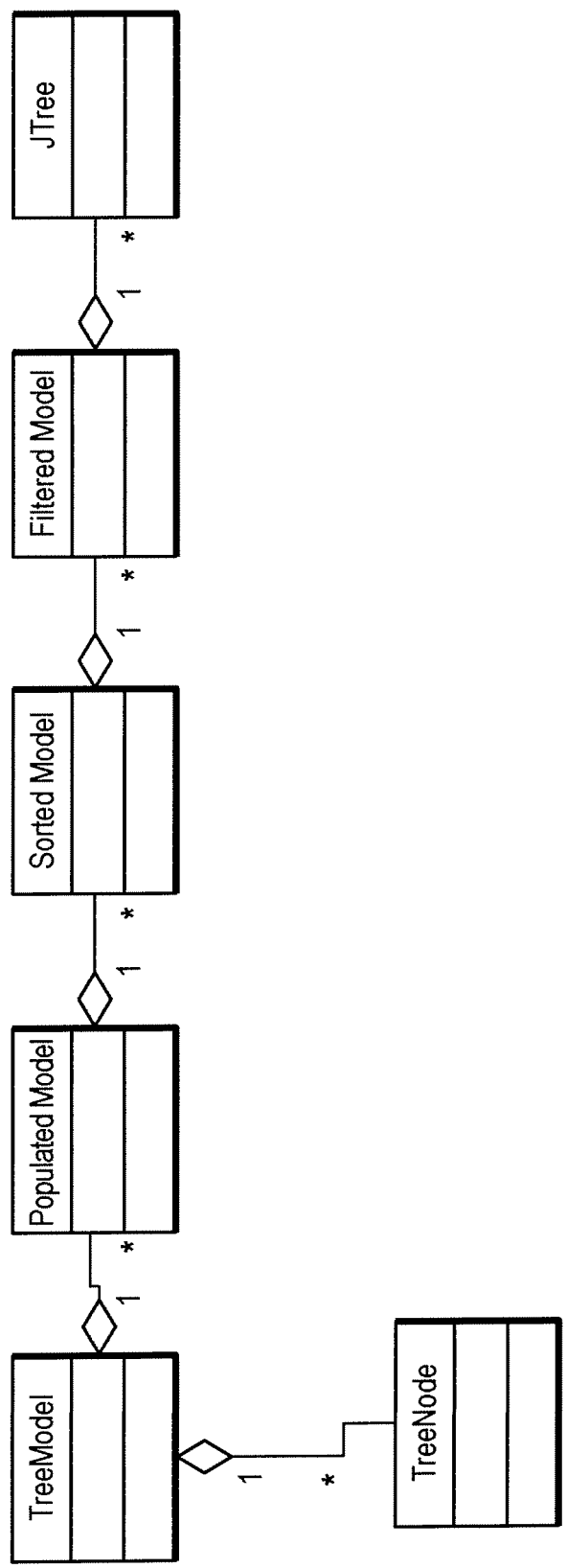

With reference to FIG. 6 which illustrates sort and filter model wrappers, model wrappers allow an underlying model to be wrapped so that a customized view of the model can be presented without affecting the original model. As provided, the underlying model may have multiple views that can be represented in different ways. In at least one implementation, each window reuses the same Sorted Model but allows different filtering and tree displays.

Figure 7:
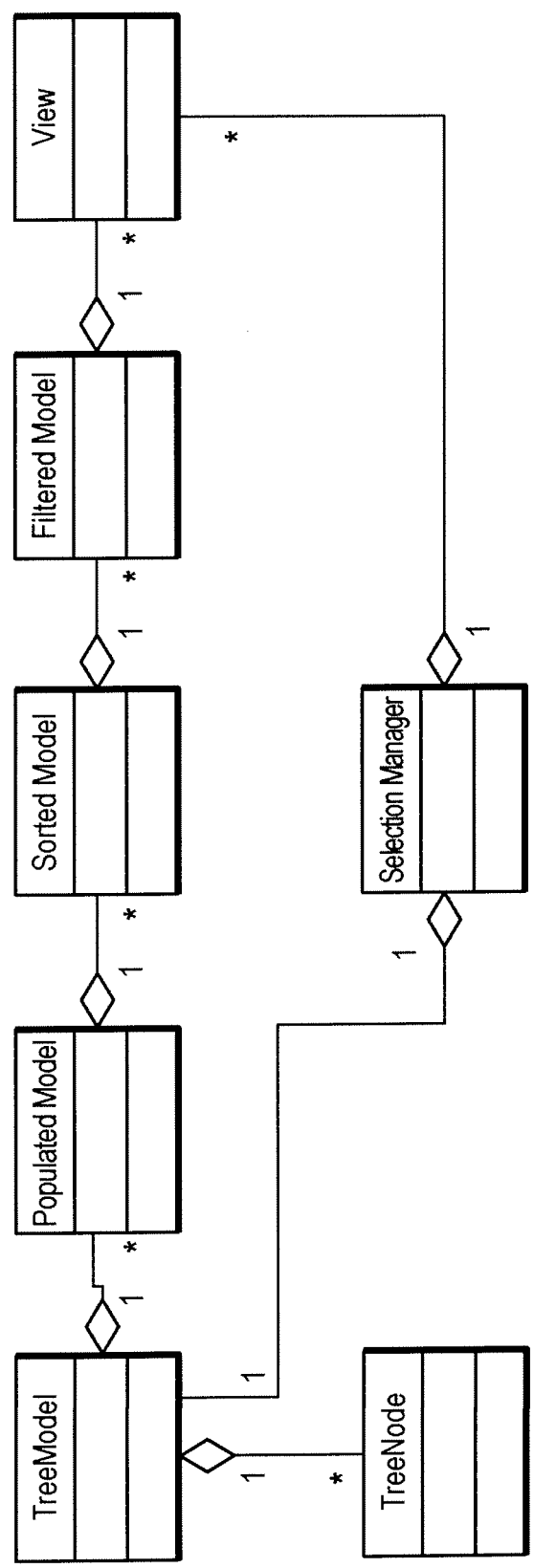

With reference to FIG. 7 illustrating linking context of multiple view, at least one implementation allows multiple views displaying the same model to communicate without the knowledge of one another in order to focus on or represent the same user defined context. Each window has a selection manager. As multiple views are added to a window (properties view/navigation bar), each model can communicate without the knowledge of the others.

Figure 8:
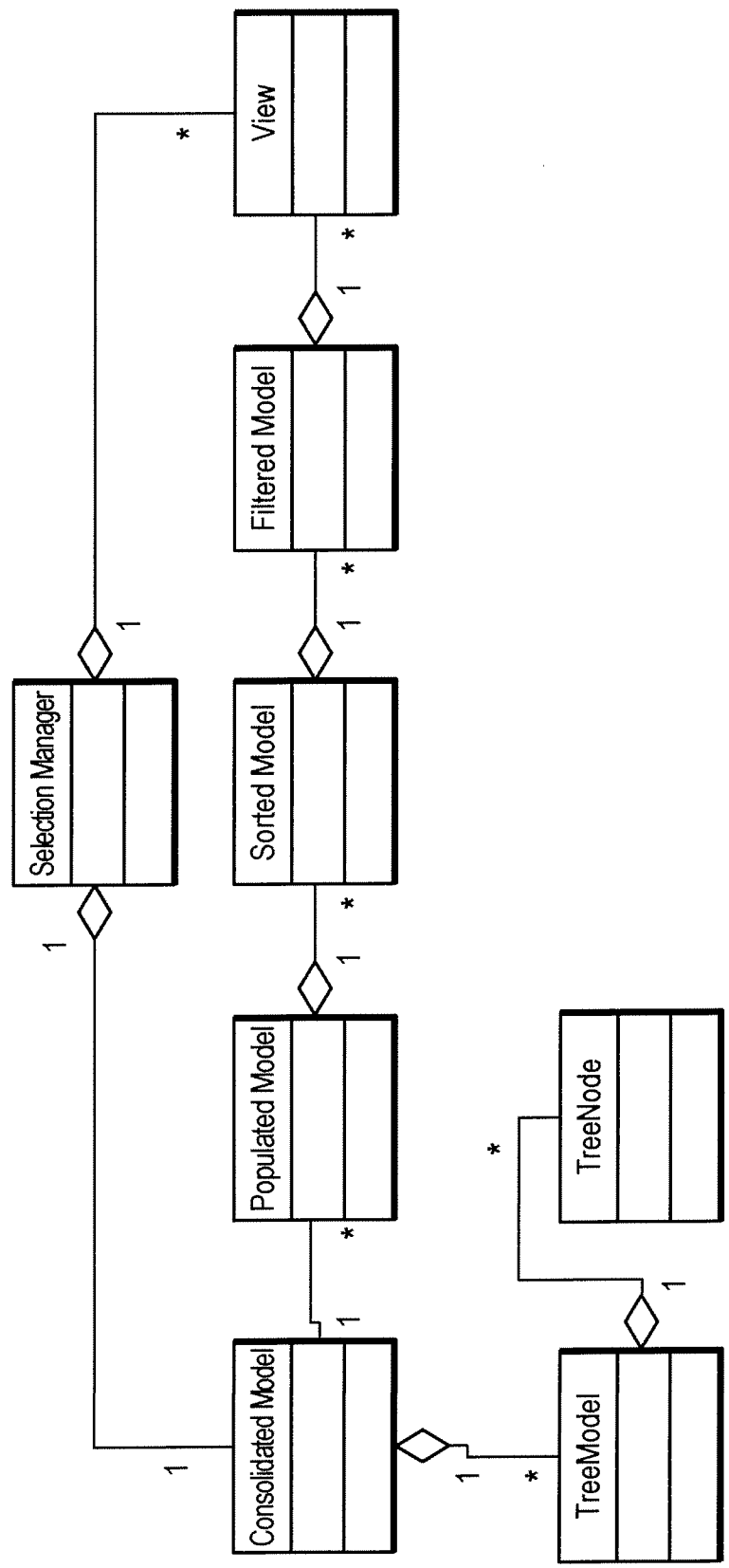

With reference to FIG. 8 illustrating multiple model sources, at least one implementation allows multiple models to be represented as one. The models can be provided independently and still be viewed within the same view or JTree as siblings.

In at least some cases, a different model is provided to represent each storage array. This facilitates support of server side model generation (group provider) within a mixed domain, and facilitates adding external objects into the tree or product.

Figure 8A:
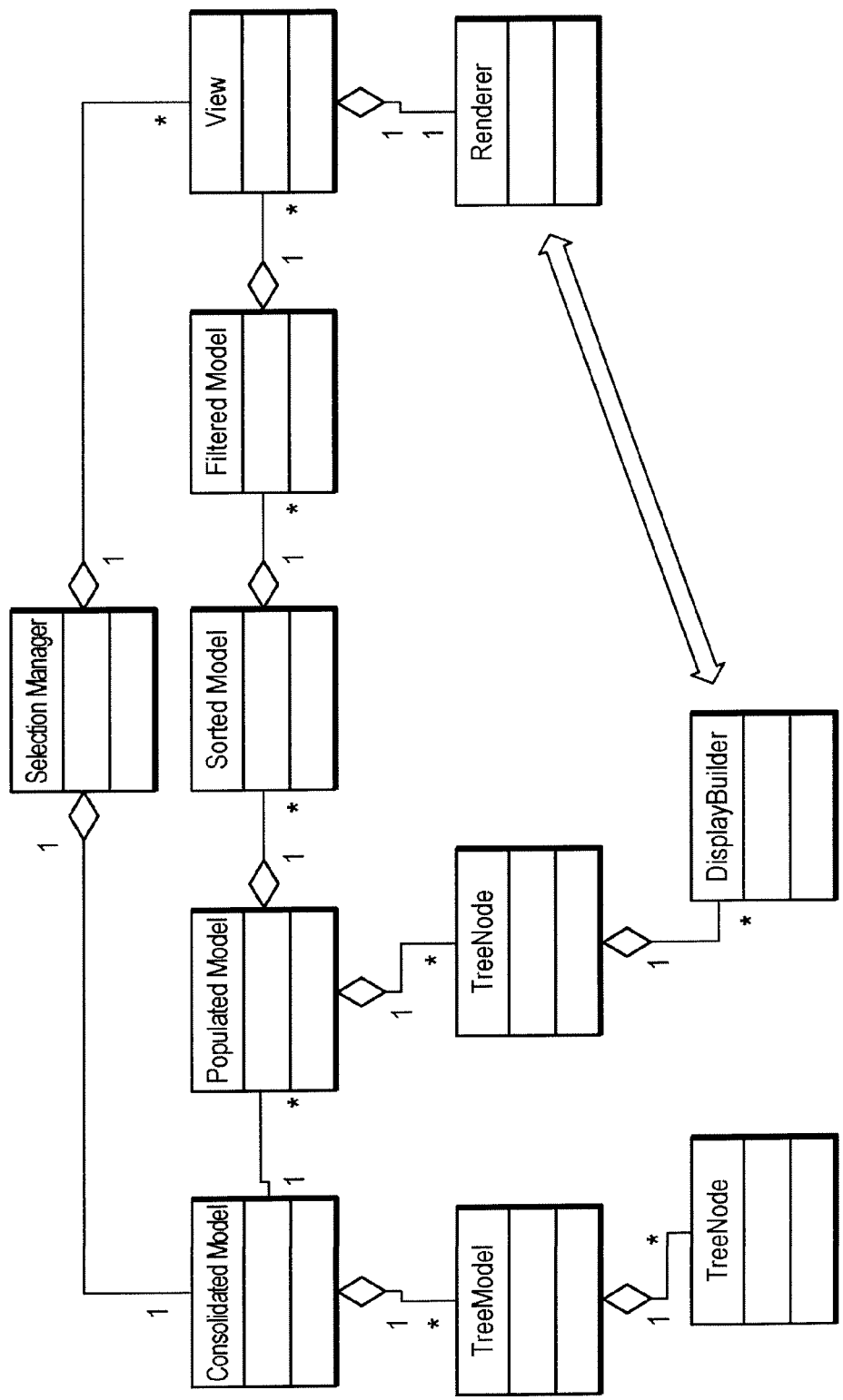

With reference to FIG. 8A illustrating customized rendering, at least one implementation allows each tree node to customize the display information that is used by the view. Display builders can be defined that generate custom information to be used by the renderer such as label and icons. This allows disjoint models to be consolidated while allowing the disjoint efforts to customize view information.

At least one implementation uses a core infrastructure package that has common reusable code that has no project dependences. The classes within the core package have no knowledge of the data storage user interface application or data storage objects. The data storage user interface tree builds upon this core package so that it is just one of many possible models that appear in the tree. Accordingly, other objects may be supported in the client tree and framework.

Figure 9:
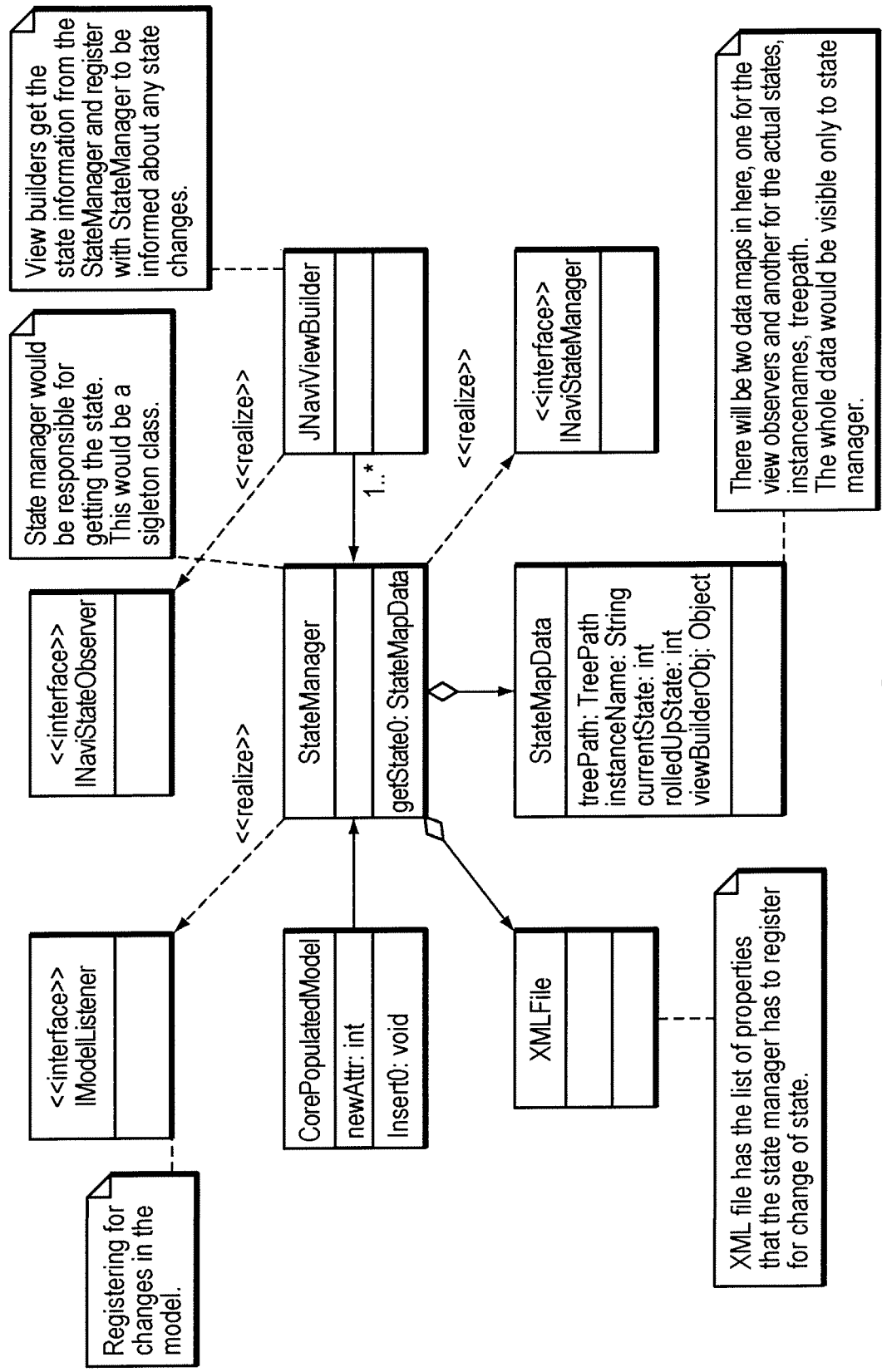

FIG. 9 illustrates a high level breakdown and other aspects of a state manager that may be used with an implementation of the technique.

With respect to filtering, a filtering mechanism uses the FilteredModel displayed in FIG. 4. Each of the filtering capabilities are isolated and implemented as separate filters. As the user selects different filter options from a drop down menu the applicable filter object is applied to the model.

Figure 10:
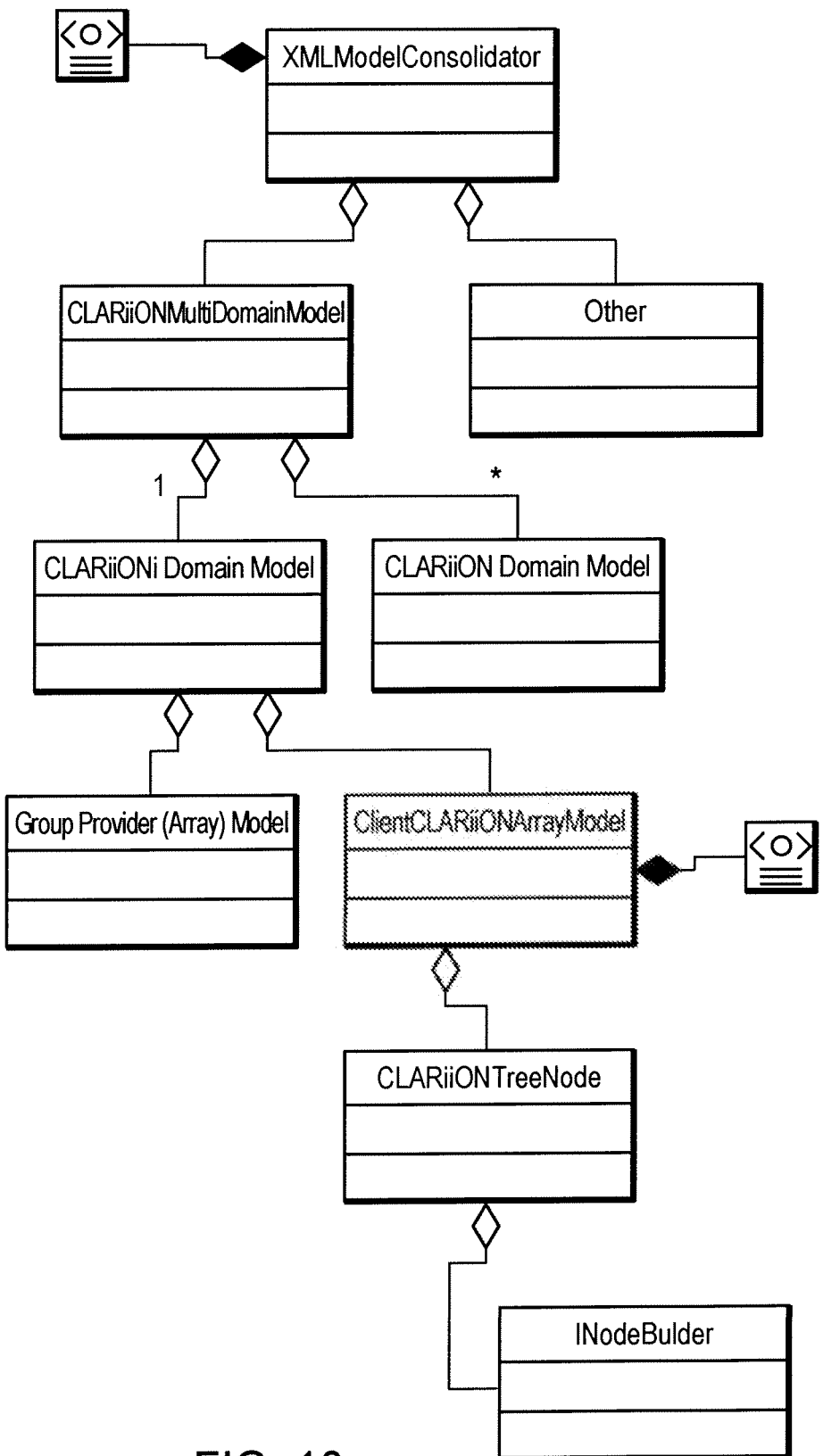

FIG. 10 illustrates a high level breakdown of the storage system model structure.

XMLModelConsolidator is provided by the core framework. An instance is created and is build from an XML file provided.

CLARiiONMultiDomainModel model controls all the CLARiiON Domains. It uses a domain manager to build and maintain its list. For each domain it creates a CLARiiONDomainModel model.

CLARiiONDomainModel model controls all the CLARiiON arrays in a domain. It use a top level object manager to build and maintain its list. For each CLARiiON array it creates a ClientCLARiiON array model.

With reference to ClientCLARiiONArrayModel, the root node of the model is a CLARiiONTreeNode where the user object is the subsystem. When the subsystem is expanded it uses XML to generate child tree nodes.

With reference to CLARiiONTreeNode, the tree node is relatively lightweight and contains enough information for a view to obtain the information for display. This tree node may also contain builders that generate can generate and maintain the children of this node.

With reference to INodeBulder, a builder's job is to maintain the list of child objects for its parent. Multiple builders can exists for a single parent.

Figure 11:
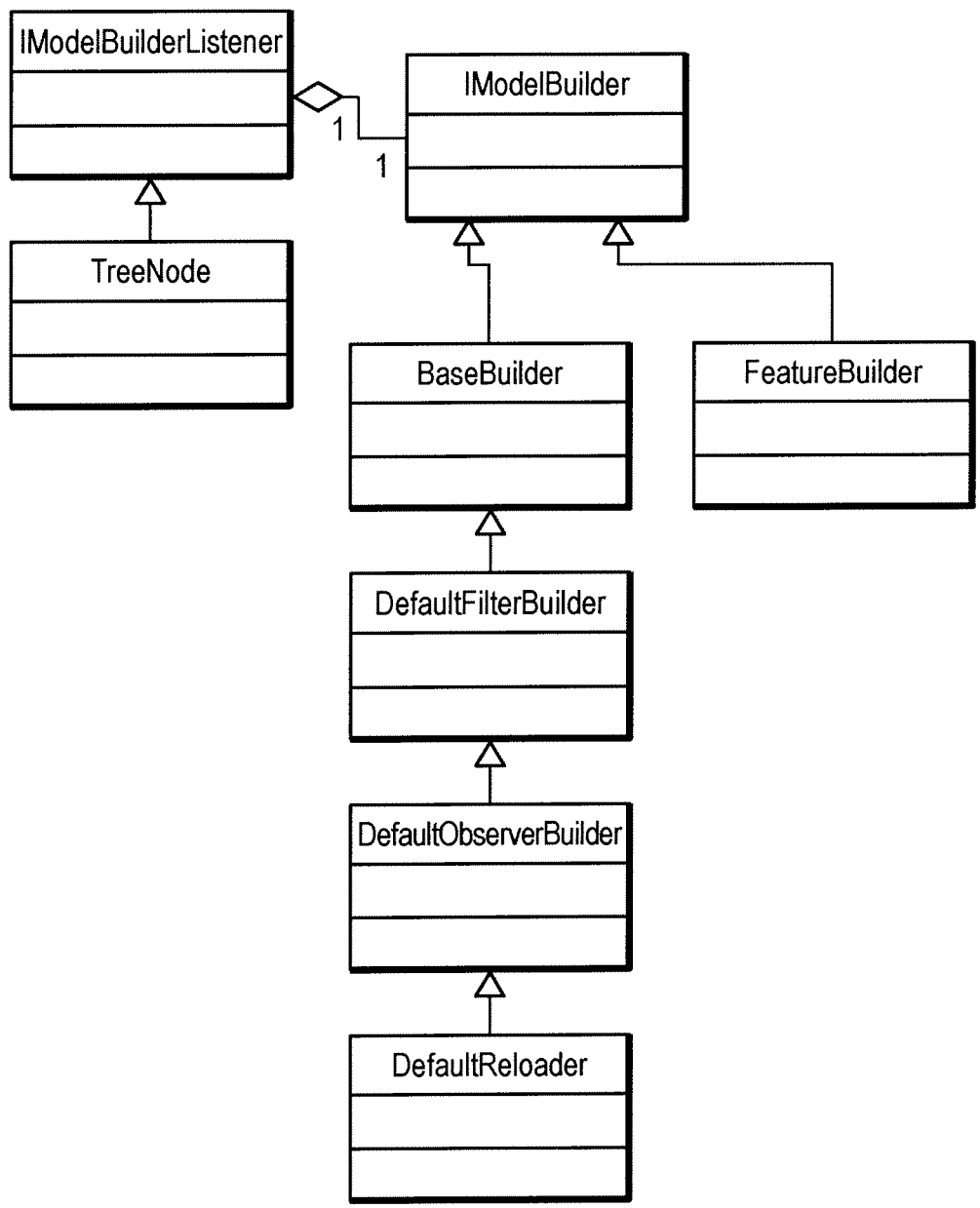

FIG. 11 illustrates a high level model breakdown of default reusable model builders, which may be extended by other builders to provide custom behavior.

BaseBuilder is a default implementation of IModel Builder that provides interactions between IModelBuilderListener and IModelBuilder.

DefaultFilterBuilder has the ability to obtain children and filter them via XML.

DefaultObserverBuilder has the ability to define add, remove, enter, leave and change observers via XML.

TreeNode tree node implements the IModelBuilderListener interface so the IModelBuilder can provide notification if objects are added or removed.

DefaultReloader has the ability to define to define a parent property that causes children reload to occur.

Figure 12:
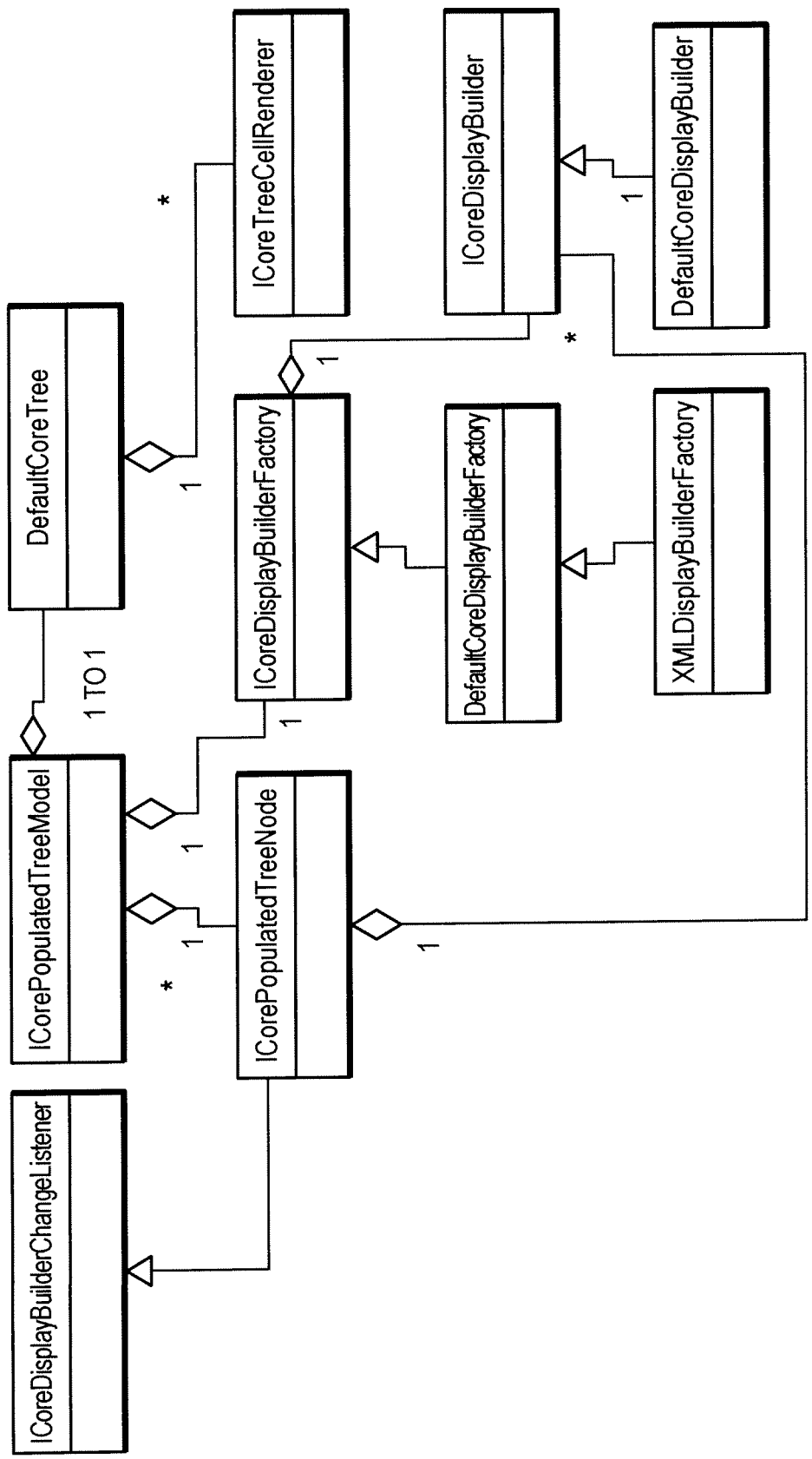

FIG. 12 illustrates a high level breakdown of display builders.

With reference to ICorePopulatedTreeModel, the populated model is responsible for generating PopulatedTreeNodes and providing the builder. The builder is obtained by using a modifiable builder factory.

With reference to ICoreTreeCellRenderer, the renderer gets the builder from the ICorePopulatedTreeNode to obtain the information for display, such as the icon and label.

With reference to ICoreDisplayBuilderFactory, the factory provides the builder for the tree node. In most cases the builder is obtained via XML based on a the object type or key.

Figure 13:
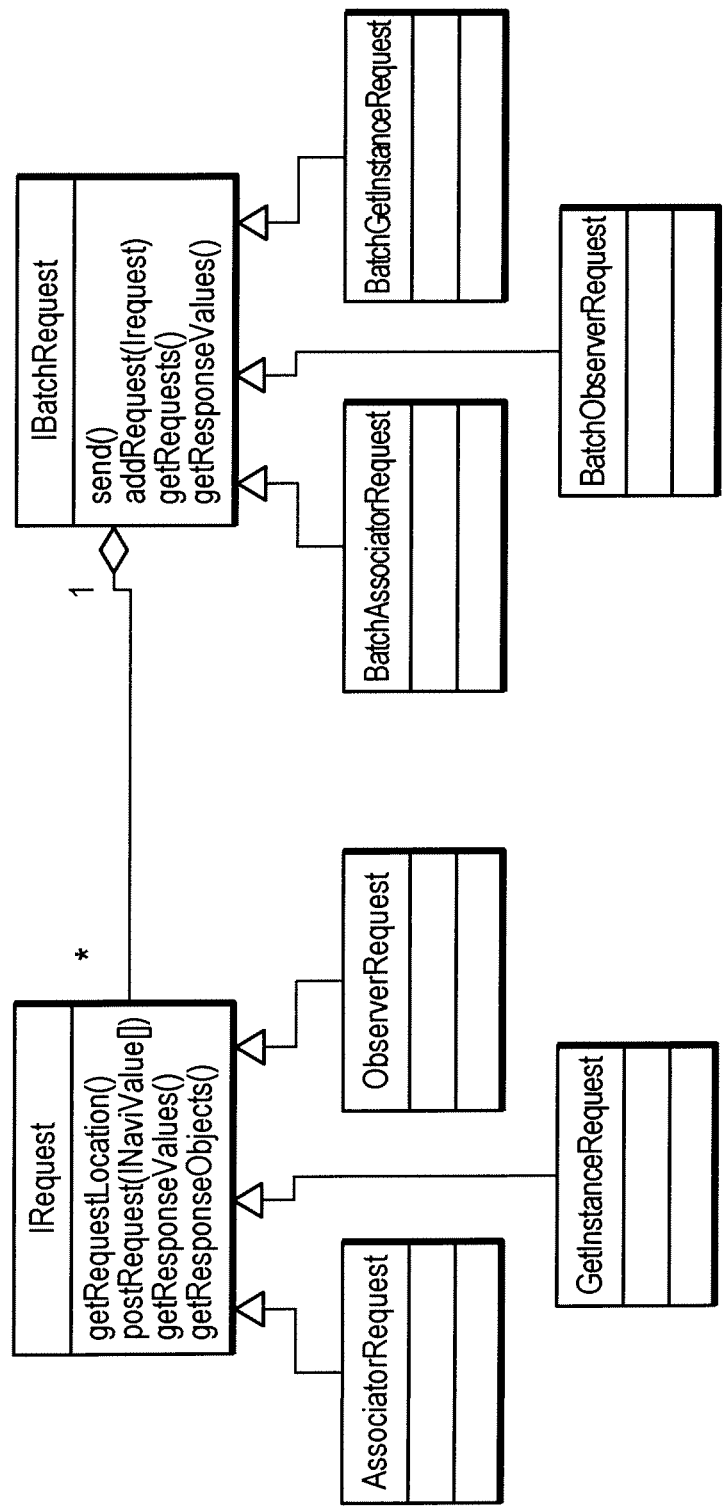

FIG. 13 illustrates a batch request. A reusable batch request API is included, which allows setting many request objects to a batch request before making the network call. The API breaks the calls into chunks as required by the storage processor's maximum request size. The API also supports requests to a different storage processor.

IRequest objects are generated set to the appropriate IBatchRequest object. In at least one implementation, request types must be the same due are required by client side parsing and object pool interaction, and the send method on the IBatchRequest is called to make the network call. The response can be obtained from the IBatchRequest as an INaviValue[ ][ ] or from each IRequest value as a INaviValue[ ].

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in displaying data storage system information, the method comprising:
   providing a graphical user interface (GUI) comprising a tree structure of logically separated GUI components, each of the GUI components being representative of one of multiple different types of tangible and intangible objects in a data storage system, the tree structure comprising lightweight information for the GUI components, wherein the lightweight information includes a parent child list of object keys for enabling on-demand loading of child nodes as needed such that items kept in memory are limited to a lightweight object key and object information associated with objects currently displayed in the GUI; and
   updating at least one of the GUI components by exercising a model view controller architecture, wherein the GUI component is derived from a model chain comprising at least a first model and a second model, wherein the second model is chained to the first model and the second model adds value to the first model, wherein the first model and second model are derived from a same core dataset and modifying data in one model in the chain causes modifications to each subsequent model in the chain.

2. The method of claim 1, wherein, within the model chain, a model link order can be changed.

3. The method of claim 1, wherein, within the model chain, links can be added and removed.

4. The method of claim 1, wherein, within the model chain, chains can spawn off existing chains.

5. The method of claim 1, further comprising:
   supporting first and second views of a same core dataset describing at least a portion of the data storage system.

6. The method of claim 1, wherein a first modification to data in a model in the model chain causes a second modification to another model in the model chain.

7. The method of claim 1, wherein the model chain comprises a lightweight model that generates a parent child list of object keys on demand.

8. The method of claim 1, wherein the model chain comprises a model that loads and formats object properties for display.

9. The method of claim 1, wherein the model chain comprises a model that makes two underlying models appear as one model.

10. The method of claim 1, wherein the model chain comprises a model that visually serves up a subset of data at a time.

11. The method of claim 1, further comprising:
    building core model child nodes only on expansion of parent node.

12. The method of claim 1, further comprising:
    inserting core model child nodes to listening models in chunks.

13. The method of claim 1, further comprising:
    retrieving child property information via a single multi-request network call.

14. The method of claim 13, further comprising:
building labels and icons from the child property information; and
removing the child property information from memory.

15. The method of claim 14, further comprising:
registering change observers; and
rebuilding the labels and icons upon change.

16. The method of claim 1, further comprising:
displaying a more and all option to an end user when applicable to allow the end user to request retrieval of the next chunk of data.

17. The method of claim 1, further comprising:
building a list of all of the child nodes of a parent node, the list having lightweight key information for each child.

18. The method of claim 1, further comprising:
using a model builder that obtains a large list of objects and filters out the objects that are not needed, wherein a thin model is used such that only the properties that are needed to perform the filtering are requested.

19. The method of claim 1, further comprising:
causing the tree structure to hold a reference to a key instead of to an object, such that the object is eligible for garbage collection after the object has been processed.

20. A system for use in displaying data storage system information, the system comprising a terminal screen configured to:

provide a graphical user interface (GUI) comprising a tree structure of logically separated GUI components, each of the GUI components being representative of one of multiple different types of tangible and intangible objects in a data storage system, the tree structure comprising lightweight information for the GUI components, wherein the lightweight information includes a parent child list of object keys for enabling on-demand loading for child nodes as needed such that items kept in memory are limited to a lightweight object key and object information associated with objects currently displayed in the GUI; and update at least one of the GUI components by exercising a model view controller architecture, wherein the GUI component is derived from a model chain comprising at least a filtering model and a sorting model, wherein the second model is chained to the first model and the second model adds value to the first model, wherein the first model and second model are derived from a same core dataset and modifying data in one model in the chain causes modifications to each subsequent model in the chain.

* * * * *